Oct. 1, 1929.  G. W. ANDREWS, JR  1,729,812
WORK HOLDING DEVICE
Filed Sept. 16, 1927
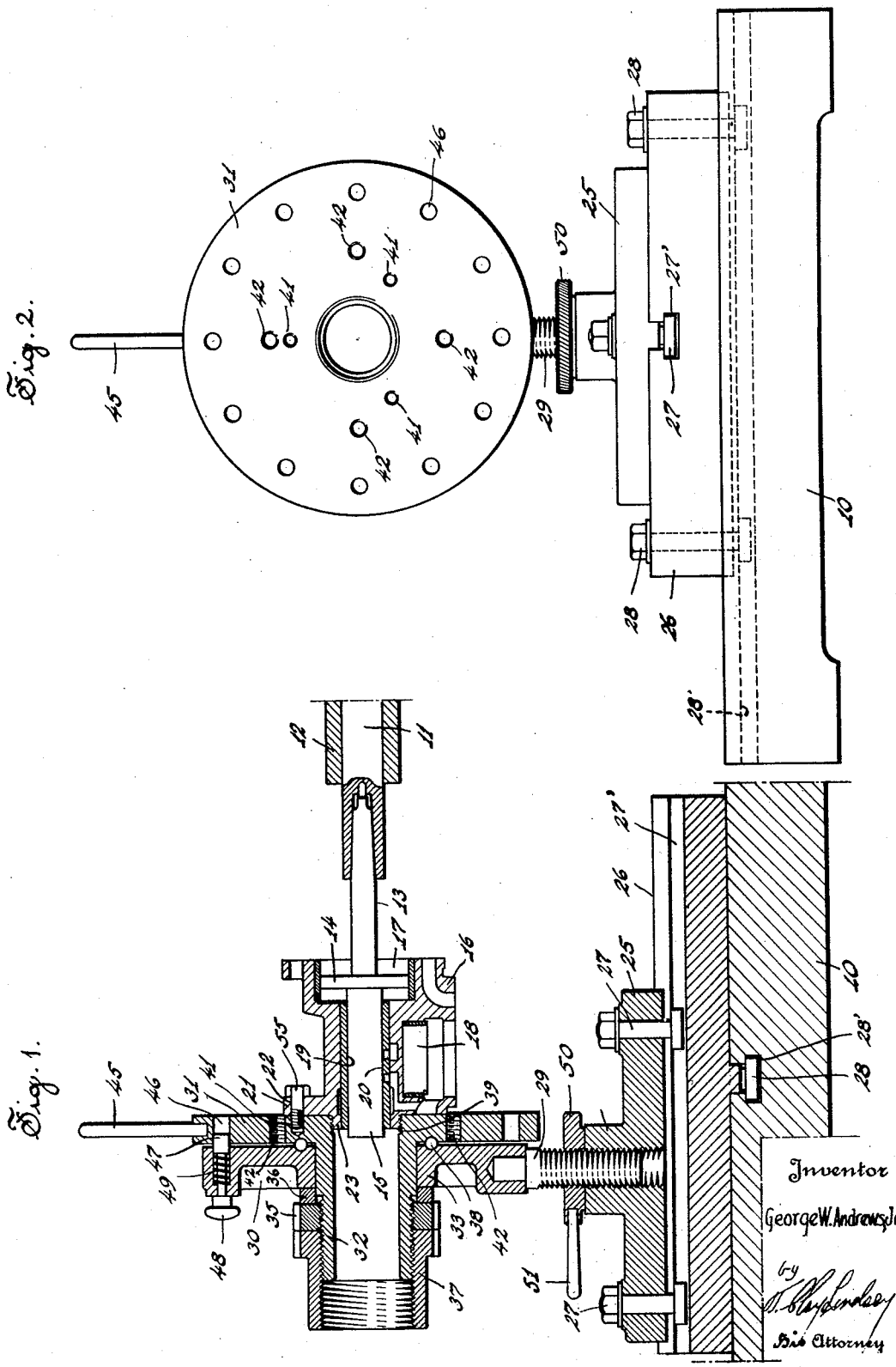

Patented Oct. 1, 1929

1,729,812

UNITED STATES PATENT OFFICE

GEORGE W. ANDREWS, JR., OF VERNON, CONNECTICUT

WORK-HOLDING DEVICE

Application filed September 16, 1927. Serial No. 219,932.

This invention relates to a device for holding pieces of work in operative relation to a tool, and has particular reference to a mechanism which finds peculiar use in holding valve bodies, the chambers, cylinders, or valve seats of which are to be reamed, lapped or polished; for example, the device may be used to advantage for holding the valve bodies of triple valves during the necessary lapping operations.

The aim of the invention is to provide an improved, simple, effective and reliable work holding device by means of which pieces of work, such as valve bodies, may be held in various positions with respect to a tool or tools, thus permitting the various portions of the work to be operated upon.

My improved construction is such that the work may be quickly and easily secured thereon and detached therefrom; the work, without removing it from the holder, may be quickly and accurately brought to numerous positions of adjustment in order that the various portions of the work may be operated upon by the tool or tools; and the various operations upon the work may be expeditiously carried out.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown for illustrative purposes, one of the many embodiments which the present invention may take;

Figure 1 is a central vertical section therethrough, this view showing, for illustrative purposes, a valve body secured to the holder and a tool operating upon the valve body.

Fig. 2 is a front view of the work holding device.

Referring to the drawings in detail, 10 designates, generally, a base which may be the bed or frame upon which the tool holder and the means for moving the tool is located. The tool holder is shown, for illustrative purposes, as being in the form of a spindle 11 located in a bearing 12. The tool may having a shank 13 carrying a cylindrical lapping tool 14 and a cylindrical extension 15. The work is shown as being in the form of a valve body 16 of a triple valve. This valve body 16 has a triple-piston chamber or cylinder 17, an emergency-piston cylinder 18, and a slide valve chamber 19, the bottom of this cylinder 19 having a seat for the usual slide valve. The valve body also has a flange 21 provided with three or four equally spaced openings 22, the number depending on the size of the valve. Extending from the body is a threaded nipple or hub 23. The work and the tool are illustrated by way of exemplification only, it being understood that these parts comprise no part of the invention, and that my improved device is adapted to support other articles than bodies of triple valves.

Referring now more specifically to my improved work holder, 25 is a slide mounted for longitudinal adjustment, and 26 is a cross slide mounted for transverse adjustment. The slide 25 carries clamping bolts 27 the heads of which engage in longitudinally extending undercut grooves 27' in the slide 26. The slide 26 is provided with clamping bolts 28 the heads of which engage in transverse grooves 28' in the base 10. Carried by the upper slide 25, for adjustment about a vertical axis, is an upstanding stud or stem 29 which carries a swivel member or support 30. The support 30 is in the form of a round plate disposed in a vertical plane. Carried by the support 30 for adjustment about a horizontal axis (which is perpendicular to the axis about which the support is adjustable) is a work holder having a disk 31 and a central hub or sleeve 32. This sleeve is journalled in a bearing 33 centrally in the support 30. The work holder is held against endwise movement relative to the member 30 by means of a nut 35 screwed upon the rearwardly extending portion of the sleeve 32. Interposed between the nut 35 and the support 30 may be a washer 36. The nut 35 may be secured in adjusted position by a locking nut or coupling 37. Positioned between the opposed faces of the member 30 and the disk 31, are anti-friction balls or bearings 38. The forward end of the central opening in the disk 31 is internally threaded, as at 39, so that the nipple 23 of the valve body may be screwed thereinto. About the center opening in the disk 31 are disposed two series of openings, one series comprising three openings 41 which correspond in position to the holes 22 in the flange 21 of a valve body of smaller size. The other series of openings 42 are four in number and correspond to the position of openings in a flange of larger size than that shown. The disk is further provided with a handle 45 by means of which the disk may be adjusted or turned about a vertical axis in order to bring the work carried thereby into proper relation to the tool. For the purpose of securing the disk or work holder 31 in any one of a number of predetermined angular positions, there is provided adjacent the outer periphery of the disk a plurality of spaced openings 46 with which is adapted to co-operate a locking plunger or key 47 carried by the support 30. This plunger has a handle 48 whereby the plunger may be withdrawn and a spring 49 which normally urges the plunger into locking position. If desired, a ratchet may be provided for moving the holder with a step by step movement, and in this event a pawl and co-operating ratchet would be provided on the stationary and fixed members respectively.

By preference the construction is such that the support 30 together with the parts carried thereby, may be vertically adjusted and to this end the stem 29 is externally threaded so as to be screwed into the threaded hub of the upper slide 25. The support is clamped in any desired position of adjustment about a vertical axis by means of a clamping nut 50 threaded on the stem 29. The nut 50 is provided with a handle 51.

In describing the manner in which my improved holder is employed, it will be assumed that the valve body illustrated comprises the work, it being understood, however, as previously stated, that my improved device may be used in other connections. To secure the valve body in place the nipple 23 is screwed into the forward end of the sleeve 32 and the flange is clamped to the disk 31 by the screws 55. The slides 25 and 26 are longitudinally and laterally adjusted in order to bring the valve body into proper alignment with the work spindle 11. Also the work holder is adjusted vertically by turning the assembly. After the proper vertical adjustment is obtained the stem 29 is secured in place by the clamping screw 50. When the parts are in the position illustrated in Fig. 1, the lapping tool 14 engages the cylindrical wall of the chamber 17 and the extension 15 has a bearing against the wall of the chamber 19. A partial rotary or oscillating and a reciprocating movement is given to the tool so as to properly ream or lap the surfaces with which the tool is in engagement. After the tool illustrated has performed its functions it may be substituted with another tool (not shown) for lapping the flat valve seat 20 without changing the position of the valve body. After the walls of the chambers 17 and 19 have been properly finished the tool is withdrawn and the plunger 47 is disengaged, whereupon the work holder by means of the handle 45 is turned ninety degrees, thus bringing the chamber 18 into a horizontal plane. The support 30 together with the parts carried thereby, are turned ninety degrees in a horizontal plane, whereupon the chamber 18 is horizontally disposed and is in parallelism with the spindle. The work holder or the spindle may then be laterally adjusted so as to bring the chamber 18 into alignment with the spindle. The lapping tool may be raised or lowered so as to adjust it in accordance with the vertical position of the work carried by the work holder. A lapping tool is then inserted into the chamber and the walls of this chamber are properly finished. It will be observed that the various operations may be carried out on the valve body without changing its relation with respect to the holder 31. This is of the utmost importance as heretofore it has been the practice in railroad shops and the like, to clamp the valve body in place and finish one surface thereof, then to disengage the valve body and reclamp it in another position and finish another surface, and so on until the various surfaces were finished. This old procedure required considerable time and was very expensive. By using my improved arrangement the valve body may be effectively lapped and polished in a very short time at a slight expense.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What I claim as my invention is:

1. In a work holding device of the character described, a vertical stud mounted for vertical adjustment and for adjustment about a vertical axis, means for clamping said stud in any desired position of adjustment, a support secured to the upper end of said stud and having an opening constituting a bearing, said opening being at right angles to the axis of said stud, a work holder having a sleeve-like portion journalled in said bearing and a disk portion, ball bearings between said disk portion and said support, nuts screwed onto said sleeve for holding the same against axial movement relative to said support, the forward end of said sleeve being internally threaded, a handle on said disk for turning the same about a horizontal axis in said support, said disk having a plurality of openings adjacent its periphery and a spring-pressed plunger carried by said support and adapted to engage in said openings.

2. In a device for holding triple, distributing valves and the like, a support mounted for angular adjustment about a vertical axis, means for securing said support in angularly adjusted position, a work holding disk having a face against which the work is adapted to engage, said disk being carried by said support for angular adjustment about a central axis perpendicular to the axis of adjustment of said support, means for locating said work holding disk in any one of a number of predetermined positions of angular adjustment, and means for securing pieces of work to said face of said disk.

3. In a device for holding triple, distributing valves and the like, a support mounted for adjustment about a vertical axis and having a longitudinally extending bearing, a work holder having a sleeve provided at one end with a work holding disk having a face against which the work is adapted to engage, said sleeve being journalled in said bearing for angular adjustment about a horizontal axis, means for securing said work holder against axial movement relative to said support, means for locating said work holder in any one of a number of predetermined positions of angular adjustment, and means on said face of said disk for securing the work thereto.

4. In a device for holding triple, distributing valves and the like, a support disposed in a vertical plane and mounted for angular adjustment about a vertical axis, said support having a central horizontally extending bearing, a work holder including a disk extending along said support and a sleeve journalled in said bearing, said disk having a face to which the work is adapted to be fixed, means for securing said sleeve against axial movement in said support, angularly spaced apart means on said face of said disk for securing the work thereto, said work holder having a plurality of angularly spaced apart openings in its periphery, and means carried by said support and adapted to selectively engage in said openings for holding said work holder in any one of a number of predetermined positions of angular adjustment.

5. In a device for holding triple, distributing valves and the like, a support disposed in a vertical plane and mounted for angular adjustment about a vertical axis, said support having a central horizontally extending bearing, a work holder including a disk extending along said support and a sleeve journalled in said bearing, said disk having a face to which the work is adapted to be fixed; means for securing said sleeve against axial movement in said support, said sleeve having at its forward end and centrally of said disk an internal thread adapted to receive the work, means on said face of said disk for securing the work thereto, said work holder having a plurality of angularly spaced apart openings adjacent its periphery, and means carried by said support adapted to selectively engage in said openings for holding said work holder in any one of a number of predetermined positions of adjustment.

6. In a device for holding triple, distributing valves and the like, a vertical stud mounted for angular adjustment, a support carried by said stud and having a bearing at right angles to the axis about which said support is angularly adjusted, a work holder having a sleeve journalled in and extending through said bearing and a disk on one end of said sleeve and adapted to engage one end of said support, said sleeve and disk having a central opening adapted to accommodate a tool and with which an opening in the work is adapted to register, said disk having a face to which the work is adapted to be secured, means on the other end of said sleeve and engaging the other end of said support for holding said work holder against axial movement with respect to said support, angularly spaced apart means on said face of said disk for securing pieces of work thereto, said holder having a plurality of openings adjacent its periphery, and a spring pressed plunger carried by said support and adapted to selectively engage in said openings.

GEORGE W. ANDREWS, JR.